June 12, 1951  L. J. POVINELLI  2,556,939
TRACTOR REVERSE GEAR

Filed Jan. 16, 1950  2 Sheets-Sheet 1

Louis J. Povinelli
INVENTOR.

BY *Clarence A. O'Brien
and Harvey B. Jacobson*
Attorneys

June 12, 1951  L. J. POVINELLI  2,556,939
TRACTOR REVERSE GEAR

Filed Jan. 16, 1950  2 Sheets-Sheet 2

Louis J. Povinelli
INVENTOR.

BY *Clarence A. O'Brien*
and *Harvey B. Jackson*
Attorneys

Patented June 12, 1951

2,556,939

UNITED STATES PATENT OFFICE 2,556,939

TRACTOR REVERSE GEAR

Louis J. Povinelli, North Bergen, N. J.

Application January 16, 1950, Serial No. 138,745

3 Claims. (Cl. 180—70)

This invention comprises novel and useful improvements in a tractor reverse gear and more particularly pertains to a reverse mechanism for lightweight garden tractors and the like.

The principal objects of this invention are to provide an improved construction of reversing gear mechanism which may be readily applied to inexpensive and lightweight types of lawn and garden tractors and the like providing an inexpensive, easily serviced and replaced type of reversing mechanism and which will inherently perform the functions of a clutch for connecting the power plant with the driving wheels of the tractor. The principles of the invention have been illustrated, solely by way of example, in the accompanying drawings, wherein.

Figure 1:
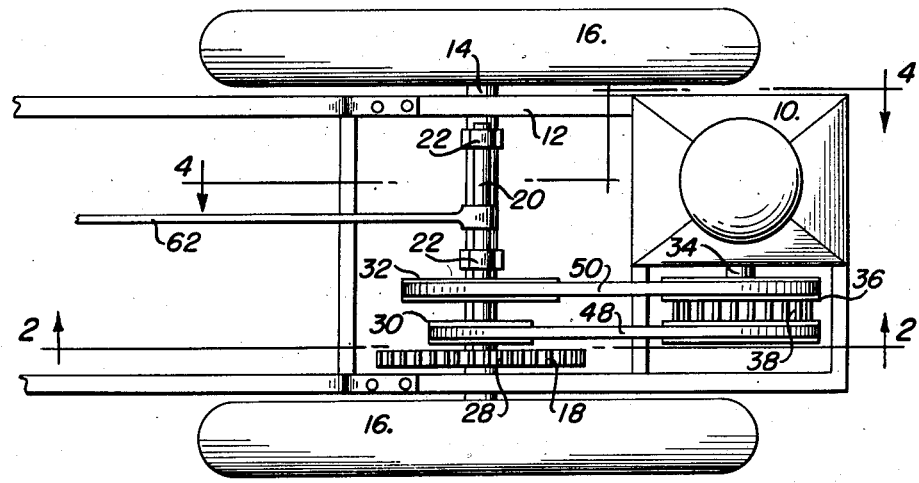
Figure 1 is a fragmentary top plan view of a portion of a suitable form of garden tractor to which the principles of this invention have been applied.

Referring now more specifically to the accompanying drawings, wherein like numerals designate similar parts throughout the various views, it will be seen that there is disclosed a portion of any conventional form of lightweight garden or lawn tractor, the same being provided with a power plant 10 which may consist of an internal combustion engine or any other suitable source of power, the engine being mounted upon a chassis 12 beneath which is journaled an axle 14 to which are secured a pair of driving wheels 16. A bull gear or ring gear 18 is fixedly secured to the axle 14 and serves to drive the same forwardly or reversely as set forth hereinafter. A lay shaft 20 is journaled in suitable bearings 22 in the outer ends of arms 24 which are journaled at their lower ends at 26 for pivotal movement upon the axle 14. The lay shaft 20 is provided with a pinion gear 28 which is movable circumferentially about but is constantly in mesh with the bull gear 18, for a purpose which will later become apparent. The lay shaft is further provided with a pair of pulleys, the same consisting of a forward speed pulley 30 and a reverse pulley 32.

The power plant is provided with an axle or power shaft 34, upon which is fixedly secured a driving pulley 36, and a driving pinion gear 38. The latter is continuously in mesh with a driven gear 40 which is suitably journaled in a depending bearing 42, by means of an axle 44, the latter having fixedly secured thereon a reverse pulley 46. A pair of pulley belts 48 and 50 are provided, the belt 48 being entrained over the pulley 46 secured to the shaft 44 and driven by the driven gear 40, over the pulley 30 to thereby drive the lay shaft 20 and then over an idler pulley 52 journaled upon one end of an arm 54, the other end of which is journaled as at 56 upon a bracket 58 depending from the chassis 12. A control rod 60 is suitably connected with the arm 54 for causing pivotal movement of the member 54 about its fulcrum 56, to thereby impart an arcuate or pivoting movement to the idler pulley 52, for selectively tensioning or releasing the tension of the belt 48.

The other belt 50, is entrained over the above mentioned pulley 36 and directly mounted on the driving shaft 34 of the power plant 10, and over the pulley 32 fixed to the lay shaft 20. A control rod 62 is suitably secured to the lay shaft 22, for causing pivotal movement of the same and of its supporting arms 24 about the axle 14.

Figure 2:
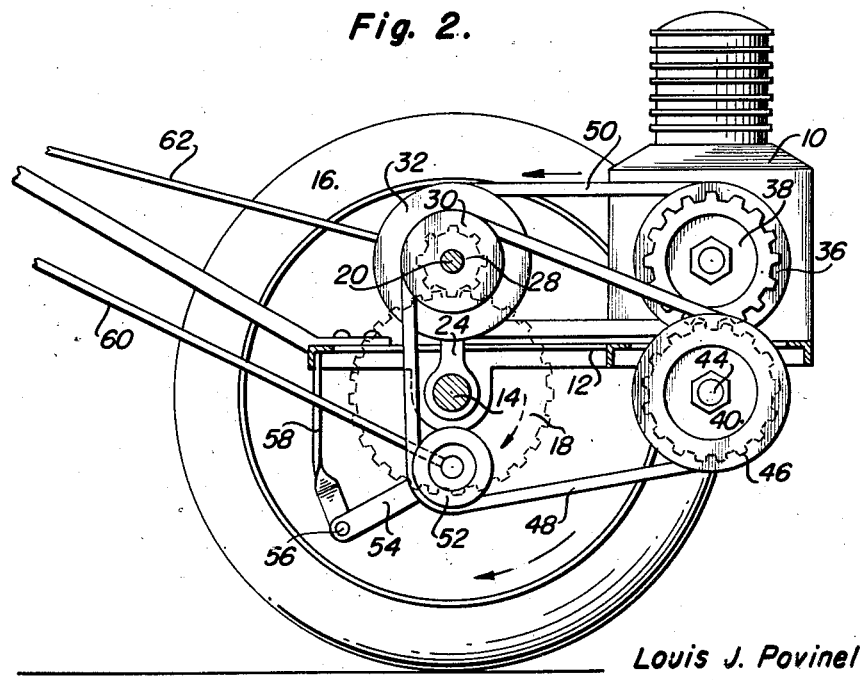
Figure 2 is a vertical longitudinal sectional view taken substantially upon the plane indicated by the section line 2—2 of Figure 1 and showing the driving gearing in the forward position.
Figure 3:
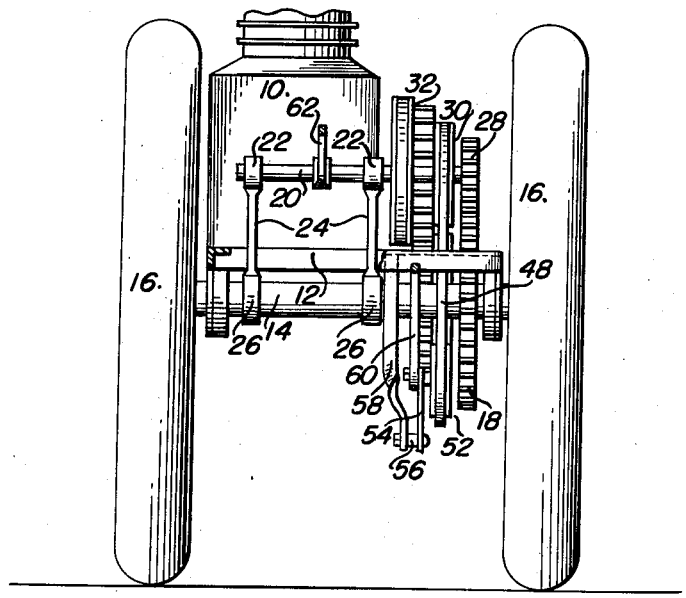
Figure 3 is a fragmentary vertical transverse sectional view through the embodiment of Figures 1 and 2.
Figure 4:
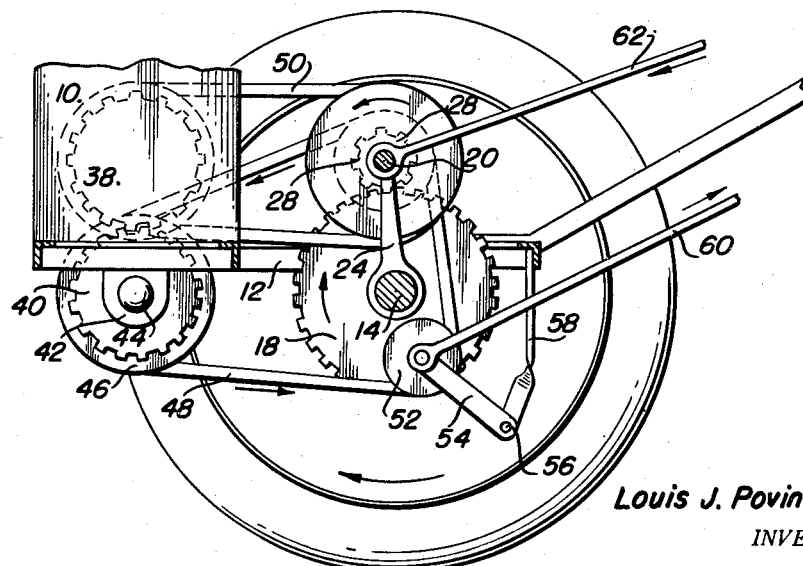
Figure 4 is a vertical longitudinal sectional view taken substantially upon the plane indicated by the section line 4—4 of Figure 1 but illustrating the mechanism in reverse gear.

From the foregoing, it is thought that the construction and operation of the device will now be readily understood. Referring to Figures 2 and 4, it will be seen that the power plant 12 may be continuously operated, thus continuously rotating the driving gear 38 and the driving pulley 36, and through the gear 38 continuously rotating the driven gear 40 and the reverse pulley 46 fixedly secured thereto. Thus, both of the pulleys 36 and 46 continuously rotate while the power plant 10 is in operation.

It will be further seen that by selectively operating the control rods 60 and 62, the idler pulley 52 may be selectively moved into a belt tensioning or belt releasing position, and likewise the lay shaft 20 may be pivotally moved about the axle 14 to move the pulley 32 into a belt tensioning or belt releasing position. It will now be apparent that either of the pulleys 32 or 52 may be moved into position to tension the belts 48 or 50, it being understood that the other belt and pulley will be in a non-tensioned position. In the position shown in Figure 2, it is to be understood that the pulley 52 is in a non-belt tensioning or inoperative position, so that the belt 48 is not being operated, while the pulley 32 by means of its control rod 62 is in a belt tensioning position so that the belt 50 directly connects the pulley 36 with the pulley 32 to cause rotation of the lay shaft 20 and through the meshing gears 28 and 18, rotate the axle and wheels to move the tractor in a forward direction.

Alternatively, as shown in Figure 4, the pulley 32 will be slackened upon the belt 50, so that the latter is inoperative; while the pulley 52 will be tightened with the belt 48 so that the power plant will drive the tractor in a reverse direction through the gears 38, 40, pulley 46, idler pulley 52, pulley 30, and through the gears 28 and 18.

From the foregoing, the operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having thus disclosed and described the invention, what is claimed as new is as follows:

1. A reversing gear for tractors comprising a power plant mounted on a chassis having an axle and supporting wheels thereon, a driving gear and driving pulley connected with said power plant, a driven gear constantly in mesh with said driving gear, a reverse pulley connected with said driven gear, a bull gear connected with said axle, a lay shaft on said chassis having a pinion meshed with said bull gear, forward and reverse pulleys secured to said lay shaft, forward and reverse drive belts entrained over said last mentioned pulleys and said driving and reverse pulleys, control means for selectively rendering said belts operative.

2. The combination of claim 1 wherein said control means includes an idler pulley engaging one of said belts, said control means including means for moving said idler pulley to selectively tension and slacken its associated belt.

3. The combination of claim 1 wherein said control means includes pivotal mounting means for said lay shaft, and further includes means for moving said mounting means to selectively cause one of said pulleys on said lay shaft to tension its associated belt.

LOUIS J. POVINELLI.

REFERENCES CITED

The following references are of record in the file of this patent:

UNITED STATES PATENTS

| Number | Name | Date |
| --- | --- | --- |
| 697,720 | Holsman | Apr. 15, 1902 |
| 804,980 | Reiss | Nov. 21, 1905 |
| 944,236 | Espe | Dec. 21, 1909 |